United States Patent

Dollase

[15] 3,640,360
[45] Feb. 8, 1972

[54] DIFFERENTIAL LOCK WITH PRESSURE MODULATING EXHAUST VALVE

[72] Inventor: William R. Dollase, Racine, Wis.
[73] Assignee: J. I. Case Company
[22] Filed: Oct. 17, 1969
[21] Appl. No.: 867,281

[52] U.S. Cl. .................. 192/4 A, 137/625.66, 192/109 F, 74/710.5, 91/446, 137/596.1
[51] Int. Cl. ..................................................... F16h 57/10
[58] Field of Search ................... 192/85, 109 F; 74/710.5; 194/4 A

[56] References Cited

UNITED STATES PATENTS

| | | |
|---|---|---|
| 2,702,618 | 2/1955 | Baker et al.............................192/109 F X |
| 2,935,999 | 5/1960 | Hock et al..............................192/85 X |
| 3,025,717 | 3/1962 | Christensen............................192/85 X |
| 3,351,170 | 11/1967 | Hengstler.............................192/109 F X |
| 3,446,320 | 5/1969 | Schott.................................74/710.5 X |
| 3,460,404 | 8/1969 | Schmid................................192/109 F X |

*Primary Examiner*—Benjamin W. Wyche
*Attorney*—Dressler, Goldsmith, Clement and Gordon

[57] ABSTRACT

A control system for a differential having first and second output shafts and hydraulic brakes for the respective shafts. The control system includes a friction device for locking and unlocking the differential and a valve which progressively pressurizes the friction device in timed relation to initial supply of pressured fluid from a source to the valve. The valve cooperates with the brakes and releases the friction device whenever either of the brakes is actuated.

10 Claims, 3 Drawing Figures

PATENTED FEB 8 1972 3,640,360
FIG. 1
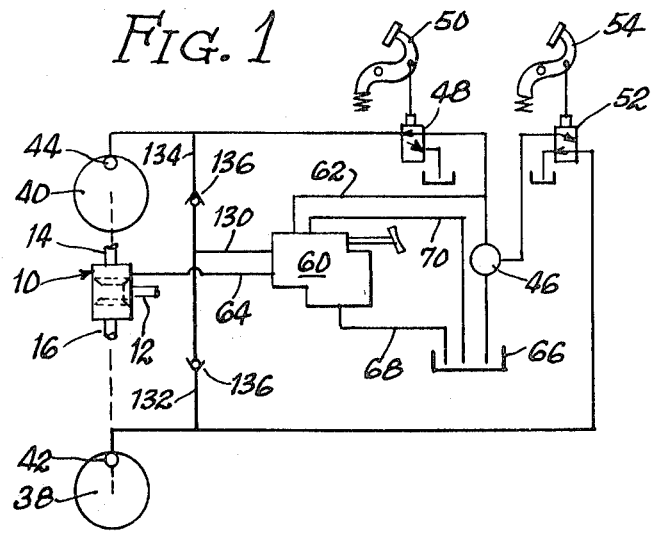
FIG. 2
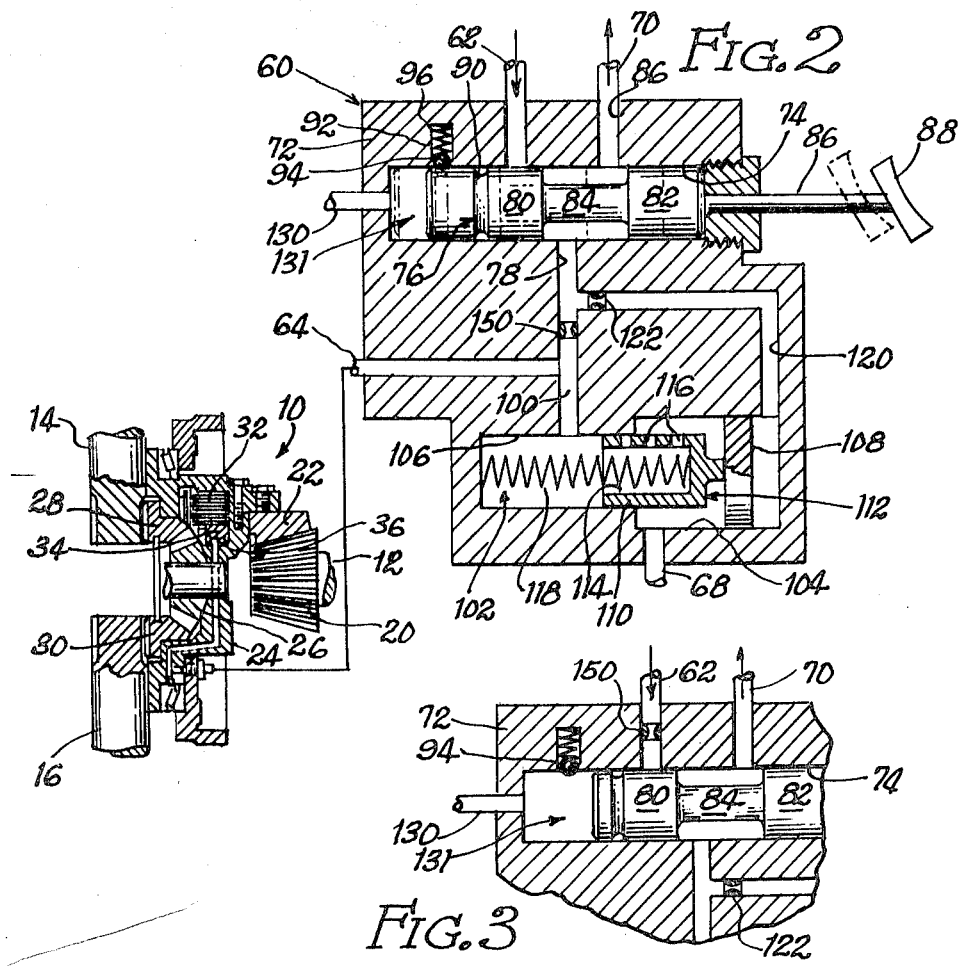
FIG. 3
INVENTOR
William R. Dollase
BY Dressler, Goldsmith, Clement
and Gordon Att'ys

DIFFERENTIAL LOCK WITH PRESSURE MODULATING EXHAUST VALVE

BACKGROUND OF THE INVENTION

The present invention relates generally to vehicles and more particularly to improved control means for locking and unlocking the differential forming part of the power train for the vehicle.

Many present-day vehicles, particularly agricultural vehicles such as tractors, incorporate differential gearing in the power train for the vehicle for delivering power from a source to a pair of driving wheels. The differential is generally designed to compensate for the varying distances which the respective drive wheels travel when the vehicle is going through a turn.

Most differentials for present-day vehicles incorporate a locking mechanism which locks the two output shafts to each other and thereby drives the shafts as a unit. Such action is necessary to prevent one wheel from slipping. The locking of the differential is accomplished in various different ways and one type of locking mechanism is disclosed in U.S. Pat. No. 3,292,720. The locking mechanism disclosed in the patented device incorporates hydraulic mechanism for interconnecting the two shafts.

The above-mentioned patented control means for locking differentials also incorporates a mechanism for automatically disengaging the locking means whenever either of the brakes are actuated. This feature is deemed necessary since the advantage of having the wheels interlocked becomes a disadvantage when a turn is made. In many instances, the turn is partially or wholly accomplished through the use of the braking system for the vehicle. Thus, the unlocking of the differential when either of the brakes for the vehicle are actuated has become a common practice.

However, the structure and mechanism disclosed in the above-mentioned patented device, has several serious drawbacks. One of these drawbacks is that the mechanism for unlocking the differential when either of the two brakes for the vehicle is actuated requires a mechanical linkage connection between the brake pedal and the control mechanism for the differential lock. Because of the location of the various parts in many vehicles, such an arrangement requires complicated linkage for producing such a connection.

Another disadvantage of the differential lock disclosed in the above-mentioned patent is the manner in which the hydraulic pressured fluid is supplied to the locking mechanism. Normally the locking mechanism includes fluid-operated friction devices and, in order to reduce costs of manufacturing the vehicle and, the source of fluid is obtained from the main pressure fluid supply for the vehicle. This fluid supply is at a substantial pressure and the arrangement contemplated in the above-mentioned patent, results in a rapid change of the differential from an unlocked condition to a locked condition. This change necessarily results because the full pressure of the source is immediately applied to the friction device whenever the control valve for the friction device is actuated. Such a condition will cause a sudden jerking of the vehicle which is not only detrimental to the various parts forming the power train of the vehicle but also may dislodge the operator from the vehicle.

BRIEF SUMMARY OF THE INVENTION

The present invention contemplates an improved control system for a differential lock that is capable of locking and unlocking a driven differential which forms a part of the power train of a vehicle. The control system incorporates a control valve which has pressured fluid supplied therethrough from a source under constant pressure with a main flow path leading through the valve to the differential lock or friction device. A branch flow path communicates with the main flow path and a fluid reservoir and incorporates mechanism for progressively restricting the flow of fluid through the branch path to the reservoir thereby progressively increasing the pressure of fluid to the friction device to cause a smooth engagement of the driven wheel connected to the differential.

The mechanism, which accomplishes the above, includes a chamber in the branch flow path with a piston slidable in the chamber and having one side in communication with the branch flow path and the second side in communication with the main flow path through a control flow path. The control flow path incorporates orifice means which restrict the flow to the closed chamber to move the piston from a biased position allowing substantially unrestricted flow though the branch path to the reservoir. The movement of the piston from the first position progressively restricts the flow through the chamber to the reservoir thereby progressively increasing the pressure of the fluid in the main flow path which is subsequently delivered to the friction or fluid-operated device.

According to another aspect of the invention, the control valve of the present invention incorporates mechanism which will automatically disengage the fluid-operated device or differential lock whenever either of the brakes for the respective output shafts is actuated. This mechanism includes a valve spool slidable within a bore that intersects the main flow path with the valve spool having a blocking position and a detented operative position. One end of the valve bore cooperates with the hydraulically operated brakes to move the valve from the detented operative position whenever either of the brakes is actuated.

BRIEF DESCRIPTION OF THE SEVERAL VIEWS OF THE DRAWINGS

FIG. 1 is a schematic illustration of a fluid control system for a differential lock and for a pair of fluid pressure actuated brakes;

FIG. 2 is a sectional view of the control valve constructed in accordance with the present invention and shown in conjunction with a differential; and FIG. 3 is a fragmentary sectional view of a slightly modified embodiment of the present control valve.

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings schematically discloses a differential 10 which forms part of a power train of a tractor that includes the internal combustion engine as well as a transmission (not shown) with the output of the transmission being connected through input shaft 12 to the differential 10. The differential 10 completes the power train to the wheels of the vehicle (not shown) through first and second output shafts 14 and 16.

For purposes of illustration, the differential 10 is of the type disclosed in the above-mentioned patent and includes a beveled pinion 20 fixed to the input shaft 12 and in mesh with a ring gear 22. The ring gear 22 is connected to a differential carrier 24 which supports a plurality of pinions 26 that are in constant mesh with beveled pinions 28 and 30 respectively fixed to the output shafts or left-hand and right-hand axles 14 and 16. The differential 10 further incorporates a fluid-operated or friction device 32 in the form of a plurality of friction discs which are alternatively connected to the pinion gear 28 and to the ring gear 22. The friction device 32 is adapted to be moved to an engaged position through a piston 34 slidable within a chamber 36. This is accomplished by supplying pressured fluid to the chamber 36 in a manner which will be described hereinafter.

The vehicle having the differential 10 incorporated therein also includes a pair of brakes 38 and 40 which respectively cooperate with the axles 14 and 16. The brakes are schematically illustrated as of the fluid-operated type and incorporate cylinders 42 and 44 which respectively have pressured fluid supplied thereto from a pump 46. The fluid circuit between the pump 46 and the cylinder 44 incorporates valve 48 which is actuated in response to movement of a foot pedal 50 to supply pressured fluid to the cylinder 44. Also, the right-hand brake 42 is likewise supplied with pressured fluid through a valve 52 operated through a foot pedal 54.

The fluid control system further includes means for selectively supplying pressured fluid to the chamber 36 so as to actuate the fluid-operated device 32. For this purpose, the control system incorporates a valve 60 having pressured fluid supplied thereto from the pump 46 through a conduit 62. The outlet port of the control valve 60 communicates with the chamber 36 through a conduit 64 while the valve is connected to a reservoir 66 through first and second return conduits 68 and 70.

According to the primary aspect of the present invention, the control valve 60 normally blocks flow of fluid from the pump 46 to the fluid-operated device 32 and is capable of progressively increasing the pressure of the fluid to clutch 32 in timed relation to the connection of the pressured fluid source to the conduit 64. For this purpose, the improved control valve 60 includes a housing 72 having a valve bore 74 slidably receiving a valve spool 76. The housing 72 further includes a main flow path 78 which extends through the valve and intersects the bore 74 with opposite ends of the main flow path 78 respectively connected to the inlet conduit 62 and the outlet conduit 64. The valve spool 76 has spaced lands 80 and 82 which are interconnected by a reduced area portion 84 and includes an actuator 86 having a foot pedal 88 on the free end thereof.

In the first position, the valve spool 76, and more particularly the land 80, blocks the flow of pressured fluid from the pump 46 through the main or first flow path 78. In this position, the portion of the main flow path 78 which is downstream of the valve bore 74 is placed in communication with return conduit 70 through the bore 74 and reduced area portion 84 so that the clutch chamber 36 is substantially free of fluid and the clutch is in the disengaged position. The valve spool 76 is capable of being moved to a second detented position for accommodating flow in the main flow path. The slidable movement is accomplished by applying a manual force to the actuator 86 by the operator engaging the pedal 88 so as to move a circumferential groove 90 in axial alignment with an opening 92 having a detent or ball 94 biased into engagement with the surface of the spool through a spring 96. In the operative position of the spool 76, pressured fluid is capable of flowing along the main flow path 78 to the clutch 32.

According to the present invention, the control valve 60 incorporates mechanism for progressively increasing the pressure of the fluid received in the chamber 36 in timed relation to initial pressurization of the main flow path with a source of fluid at a constant relatively high pressure.

This mechanism incorporates means for defining a branch flow path between the main flow path 78 and the reservoir 66. This means includes a bore 100 communicating at one end with the main flow path 78 and at the opposite end with a chamber 102. The branch flow path 100 is connected to one end of the chamber 102 while the second return conduit 68 is connected to an intermediate portion of the chamber 102 and defines the outlet for the branch flow path. The chamber 102 has an enlarged portion 104 and a reduced portion 106 with the respective portions receiving a first portion 108 and a second portion 110 of a piston 112. The second portion 110 of the piston has a counterbore 114 therein and includes a plurality of openings 116 which define a plurality of secondary flow paths between the bore 100 and the return conduit 68.

The piston 112 is biased to a first position through spring 118 having one end received in the counterbore 114 and the opposite end in engagement with the end of the chamber 102. Thus, the piston 112 including portions 108 and 110 is normally biased to a position where the openings 116 are all in communication with the enlarged portion 104 of the chamber as well as the return conduit 68 to provide substantially unrestricted flow between the branch flow path 100 and the reservoir 66 to prevent pressurization of the chamber 36.

The mechanism or means for progressively increasing the pressure to the chamber 36 further includes means for restricting the flow between the branch path and the reservoir. This means includes a control flow path comprising a bore 120 having one end in communication with the main flow path 78 and the opposite end in communication with the free end of the enlarged portion 104 of chamber 102. The control flow path has orifice means 122 therein which restrict the flow of pressured fluid to the enlarged portion 104 of the chamber 102. As more clearly shown in FIG. 2, the piston 112 has first and second cross-sectional areas which are respectively exposed to the pressure of the fluid in the branch path and the pressure of the fluid in the control path 120. The first area is defined by the portion 110 of the piston while the second area is defined by the portion 108. It will be noted that the cross-sectional area of the piston portion 108 is greater than that of the piston portion 110 so that an equal pressure of fluid to opposite ends of the chamber 102 will cause a movement of the piston 112 to the left, as viewed in FIG. 2.

The particular construction and arrangement of the branch flow path, the chamber, the piston 112 and the control flow path 120 cooperates to progressively reduce the flow of pressured fluid received in the main flow path 78 to the reservoir 66. This progressive reduction in flow results from the movement of the piston 112 leftward, as viewed in FIG. 2, to block an increased number of openings or secondary flow paths 116 thereby progressively reducing the flow between the branch path 100 and the reservoir 66. The time required for the movement of the piston 112 to the extreme left position of FIG. 2 is determined by, among other things, the orifice 122 in the control flow path 120. This orifice 122 will therefore establish a time delay between initial pressurization of the main flow path and the subsequent supply of the full pressure of the source of fluid to the fluid device 32 with the pressure of the fluid in the fluid-operated device being progressively increased until it reaches a maximum equal to the input pressure to the control valve.

The maximum pressure to the clutch 32 is reached when the piston 112 is at the extreme left position of FIG. 2 to block all of the openings 116 thereby completely blocking flow of fluid from the branch path 100 to the reservoir 66. This particular arrangement will allow any timed relationship to be established between initial pressurization of the main flow path 78 and subsequent complete pressurization of the friction device or clutch 32. As was indicated above, such an arrangement is extremely important to provide a completely satisfactory arrangement for locking the differential of a vehicle in a manner to prevent any sudden jar to the vehicle as well as to the operator.

According to a further aspect of the present invention, the fluid control system further incorporates mechanism for automatically moving the valve spool 74 from the detented operative position whenever either of the brakes 38 or 40 is actuated. For this purpose, the fluid system of the present invention incorporates a fluid connection means between the supply of pressured fluid to the respective brakes and to the valve bore 74. This connection includes a conduit 130 communicating with a chamber 131 defined at one end of the valve bore 74 with the conduit 130 being divided into branch conduits 132 and 134 each having a one-way valve 136 therein. The respective branch conduits 132 and 134 cooperate with the conduits leading between the respective valves 48 and 52 and the fluid cylinders 42 and 44. Thus, whenever either of the brakes 38 or 40 is actuated, the pressure of the fluid supplied to either of the brakes is also supplied to the chamber 131 in the valve bore 74. The fluid under pressure received in the end of the bore 74 will overcome the bias of the spring 96 and allow the detent 94 to be moved out of the groove 90 thereby moving the valve spool 76 to its first position.

According to another aspect of the invention, in order to reduce the amount of fluid which passes through the control valve 60 from the time of initial pressurization of the main flow path 78 and complete pressurization of the fraction device or clutch 32, the main flow path 78 further incorporates a second orifice 150 which restricts the flow of fluid from the source through the main flow path.

In the embodiment disclosed in FIG. 2, the orifice 150 is located downstream of the connection of the control flow path 120 to the main flow path while, and in the modified form of the control valve shown in fragmentary section in FIG. 3, the reduced section or orifice 150 is located upstream of the valve bore 74 and of the connection of the control flow path 120 to the main flow path 78. The advantage of locating the orifice upstream of the bore 74 is that the pressured fluid applied to the orifice 122 experiences an initial drop through orifice 150. Hence, the time delay is controlled by two orifices in series instead of the single orifice 122.

The operation of the series orifice arrangement, depicted in FIG. 3, depends upon an initial pressurization being present in the branch path 100 due to an initial flow of fluid, such as oil, through the plurality of openings 116 which define orifices. The openings 116 are of such a size to produce a restriction in the branch path and causes an initial buildup of pressure in the branch path to pressurize the control flow path 120.

It will be appreciated that the present invention provides a simple and efficient manner for controlling the pressurization of the friction device or clutch in timed relationship subsequent to initial pressurization of the flow path to the clutch. Furthermore, the control system of the present invention provides a simple and efficient expedient of automatically disengaging the clutch or locking device 32 whenever either of the two brakes is actuated. This latter mechanism is simply and effectively incorporated into the system by the mere inclusion of two conduits and check valves between the respective control means for selectively supplying pressured fluid from the main source to the respective brakes.

What is claimed is:

1. In a vehicle having a power train including a driven differential having first and second output shafts; a fluid-operated friction device for selectively locking and unlocking said differential; and a fluid system including a pressured fluid source, a reservoir, a control valve and conduit means connecting said source, reservoir and friction device to said control valve, the improvement of said control valve comprising: a housing having a first flow path connecting said source to said friction device; and means progressively increasing the pressure of fluid in said first flow path, said last means including a plurality of separate secondary flow paths between said first flow path and said reservoir; a control flow path leading from the main flow path; and movable means responsive to the pressure of fluid in the control flow path to block an increased number of the secondary flow paths in timed relation to initial pressurization of said main flow path.

2. The combination as defined in claim 1, in which said last means includes means defining a chamber having one end in communication with said first flow path, an intermediate portion communicating with said reservoir, and an opposite end communicating with said control flow path; and a piston slidable in said chamber and normally maintained in a first position, said piston cooperating with said chamber to define said secondary flow paths.

3. The combination as defined in claim 2, further including orifice means in said control flow path restricting flow to said chamber.

4. The combination as defined in claim 2, in which said piston has a plurality of openings defining said secondary flow paths.

5. A fluid control system as defined in claim 3, in which said first flow path has second orifice means therein and said control flow path communicates with said main flow path downstream of the second orifice means; and said piston has first and second opposed cross-sectional areas respectively exposed to the fluid in said secondary flow paths and said control flow path, said second area being greater than said first area whereby said piston will be moved from a first position with substantially equal pressure of fluid on opposite ends of said piston.

6. The combination as defined in claim 1, and including first and second fluid pressure operated brakes and control means selectively supplying pressurized fluid from said source to said brakes, the further improvement of a valve spool slidable in a bore in said housing, said spool having a detented operative position accommodating flow of fluid from said source through said first flow path and means operatively connecting said control means to said bore to move said valve spool from the operative position when either of said brakes are engaged and block the flow of fluid from said source to said friction device when said brakes are engaged.

7. In a vehicle having a power train including a driven differential having first and second output shafts; a fluid-operated friction device for selectively locking and unlocking said differential; and a fluid system including a pressured fluid source, a reservoir and a control valve, and conduit means connecting said source, reservoir and friction device to said control valve, the improvement of said control valve comprising: a housing having a first flow path connecting said source to said friction device; branch path means connecting said first flow path to said reservoir; means defining a chamber having one end in communication with said branch path and an intermediate portion communicating with said reservoir; a piston slidable in said chamber, said piston having a plurality of openings providing communication of said branch path with said reservoir; biasing means normally maintaining said piston in a first position accommodating substantially unrestricted flow from first flow path to said reservoir through said openings to prevent an increase in pressure of the fluid to said friction device; means defining a control flow path between said first flow path and an opposite end of said chamber; and orifice means in said control flow path restricting flow to said chamber, the flow of fluid to said chamber moving said piston from said position to block an increased number of openings and progressively restrict the flow of fluid through said branch path to thereby increase the pressure of fluid to said friction device and cause gradual engagement of said friction device.

8. A vehicle as defined in claim 7, and including first and second fluid pressure operated brakes and control means selectively supplying pressured fluid from said source to said brakes, the further improvement of a valve spool slidable in a bore in said housing, said spool having a detented operative position accommodating flow of fluid from said source through said first flow path and means operatively connecting said control means to said bore to move said valve spool from the operative position when either of said brakes are engaged and block the flow of fluid from said source to said friction device when said brakes are engaged.

9. The combination as defined in claim 7, including the further improvement of orifice means in said first flow path restricting flow of fluid from said source to said device and said control flow path.

10. In a vehicle having a power train including a driven differential having first and second output shafts; a fluid-operated friction device for selectively locking and unlocking said differential; and a fluid system including a pressured fluid source, a reservoir, a control valve; and conduit means connecting said source, reservoir and friction device to said control valve, the improvement of said control valve comprising: a housing having a first flow path connecting said source to said friction device with a valve bore intersecting said first flow path; a valve spool slidable in said bore and having a first inoperative position blocking flow in said path and an operative position accommodating flow in said path; branch path means connecting said first flow path to said reservoir downstream of said valve bore; means defining a chamber intersecting said branch path with a piston slidable in said chamber; biasing means normally maintaining said piston in a first position accommodating substantially unrestricted flow of fluid through said branch path; means defining a control flow path communicating at one end with said first flow path between said valve bore and said branch path and at its opposite end with one end of said chamber and said piston so that movement of said valve spool to the operative position will progressively increase the pressure of fluid in said one end of said chamber and move said piston, said piston having orifice means therethrough to progressively restrict the flow of fluid through said branch path when said valve spool is moved to said operative position and thereby progressively increase the pressure of fluid to said friction device to cause gradual engagement of said friction device.

* * * * *

PO-1050
(5/69)

UNITED STATES PATENT OFFICE
CERTIFICATE OF CORRECTION

Patent No. 3,640,360  Dated March 10, 1972

Inventor(s) William R. Dollase

It is certified that error appears in the above-identified patent and that said Letters Patent are hereby corrected as shown below:

Column 6, line 34 insert "said" after "from"

Signed and sealed this 20th day of June 1972.

(SEAL)
Attest:

EDWARD M. FLETCHER, JR.
Attesting Officer

ROBERT GOTTSCHALK
Commissioner of Patents